United States Patent Office 3,230,251
Patented Jan. 18, 1966

3,230,251
SEPARATION OF 4,4'-BIBENZOIC ACID FROM A MIXTURE OF CARBOXYLIC ACIDS
Tom F. Davenport and Graham A. Stoner, Baton Rouge, La., assignors to Ethyl Corporation, New York, N.Y., a corporation of Virginia
No Drawing. Filed Jan. 31, 1962, Ser. No. 170,253
15 Claims. (Cl. 260—525)

This invention relates to a process for separating 4,4'-bibenzoic acid from a mixture of carboxylic acids.

Heretofore, 4,4'-bibenzoic acid has been extremely difficult to separate from other mixtures of carboxylic acids using known techniques such as recrystallization and the like. For example, certain processing methods for making 4,4'-bibenzoic acid produce as many as 23 by-products. These by-products are for the most part carboxylic acids which may or may not be aromatic in nature.

Typical of the aromatic acids present in the mixture are isomers of 4,4'-bibenzoic acid such as 2,2'-bibenzoic acid, 3,3'-bibenzoic acid, 2,3'-bibenzoic acid as well as other aromatic acids such as benzoic, terephthalic, and like acids. Typical of acids which are not aromatic in nature are sydroaromatic acids, examples of which are tetrahydrobibenzoic acid, dihydrobibenzoic acid, and dodecahydrobibenzoic acid. Many of these isomers and hydroaromatic by-products have similar solubilities in common solvents such as ethers, cyclic ethers, glycol ethers, alcohols, aromatic hydrocarbons, aliphatic hydrocarbons, and the like. Thus, separation of 4,4'-bibenzoic acid from the mixture of acids by recrystallization or solvent extraction procedures is impractical.

Esterification of the mixture of acids and subsequent recrystallization of the esters in selected solvents, such as those listed above, has also proved to be impractical. The esters of these by-products also have similar solubilities such that the ester of 4,4'-bibenzoic acid when obtained by this method is adulterated with the esters of some of the other acids. Hence, pure 4,4'-bibenzoic acid is extremely difficult to obtain when in mixture with other carboxylic acids.

It is therefore an object of this invention to provide a technique of separating 4,4'-bibenzoic acid from a mixture of carboxylic acids. It is a further object to produce essentially pure 4,4'-bibenzoic acid by this method. Other objects will be obvious from the ensuing description.

The above and other objects are accomplished by the provision of a process for the separation of 4,4'-bibenzoic acid from a mixture of carboxylic acids. This separation is accomplished by contacting the mixture of acids with a secondary alcohol in the presence of an acid esterification catalyst. Conventional esterification conditions are imposed upon the system and this results in esterification of the acids other than 4,4'-bibenzoic. Therefore, the resultant reaction mixture is composed of unreacted 4,4'-bibenzoic acid and one or more esters of the other acids intially present. The nature of the resultant mixture is such that 4,4'-bibenzoic acid can be recovered by centrifugation, filtration, distillation or extraction.

In a preferred embodiment of this invention, secondary butyl alcohol or isopropyl alcohol is employed in the esterification process since these secondary alcohols give excellent results and are economical.

A surprising feature of this invention is that other carboxylic acids such as terephathalic acid, 3,3'-bibenzoic acid, 2,2'-bibenzoic acid, 2,3'-bibenzoic acid, tetrahydrobibenzoic acid, and the like readily esterify with secondary alcohols such as isopropyl and secondary butyl alcohols in the presence of an acid catalyst. However, 4,4'-bibenzoic acid reacts at an extremely slow rate, thus permitting the other acids present in the mixture to completely esterify, leaving essentially all of the bibenzoic acid in an unreacted solid state in the solution. The esters of acids other than the unreacted 4,4'-bibenzoic acid go into solution. The 4,4'-bibenzoic acid is left in the solid phase, thus enabling one to recover the 4,4' acid by centrifugation, filtration, or distillation. In those rare instances where some of the acids other than 4,4'-bibenzoic acid may be unreactive with the alcohol, the unreacted acids go into solution, thus resulting in an essentially complete separation.

The mixtures of acids which are subjected to the present process are generally any mono- or polycarboxylic acid mixtures which would normally be present in a reaction mass wherein 4,4'-bibenzoic acid is produced or with which it is otherwise normally associated. Typical of the acids which may be present in the mixture are phthalic, terephthalic, isophthalic, benzoic, toluic, p-toluic, 4-carboxy biphenyl, 2,2'-bibenzoic, 3,3'-bibenzoic, and of course the desirable acid 4,4'-bibenzoic, as well as hydroaromatic acids such as tetrahydrabibenzoic acid, dihydrobibenzoic acid, dodecahydrobibenzoic acid, and the like.

In accordance with this invention, these various mixtures of acids can be contacted with a secondary alcohol such as isopropyl alcohol or secondary butyl alcohol in the presence of an acid catalyst such as sulfuric acid or anhydrous hydrogen chloride. The mixture is heated to the reflux temperature of the system for a time ranging from about 30 minutes to about 12 hours. Upon cooling the mixture, the solid unreacted unesterified bibenzoic acid is separated from the esters of the other acids in the mixture by filtration. The 4,4'-bibenzoic acid thus obtained is in a high degree of purity. If desired, the recovered acid may then be esterified with a primary alcohol to obtain the ester.

The particular alcohols which have been found not to react readily with 4,4'-bibenzoic are secondary alcohols. Generally any secondary alcohol containing up to about 8 carbon atoms can be used. The perferred alcohols are isopropyl alcohol and secondary butyl alcohol since these alcohols are more economical and excellent results are obtained wherein 4,4'-bibenzoic acid is readily separated from a mixture of acids. The use of these two alcohols is in no way to be construed as limiting since other secondary alcohols such as isoamyl alcohol, 2-pentanol, 3-pentanol, 2-octanol, 2-hexanol, 3-hexanol, and the like may be used. In some instances, tertiary alcohols such as teritary butyl alcohol may be employed.

As in other cases, the amount of alcohol employed is generally an excess, at least a workable slurry. Thus, the amount of alcohol which may be employed generally is in excess of the stoichiometric amount neeeded.

The catalysts employed in the process of this invention can in general be any esterification catalysts such as mineral acids. Typical examples of acid catalysts are sulfuric acid, hydrochloric acid, toluene sulfonic acid phosphoric acid, hydrogen fluoride, hydrogen bromide, pyrosulfuric acid, hydrogen iodide, and the like. In some instances esterification catalysts such as zinc oxide may be used. The most preferred acid catalysts used in the process of this invention are anhydrous hydrogen chloride, concentrated sulfuric acid, and p-toluene sulfonic acid since these compounds are cheaper and more easily obtained.

The amount of mineral acid present in the system is based on the weight amount of acids present. Therefore, the amount of acid employed generally ranges from about 1 to about 50 weight percent, based on the amount of acids present. The preferred amount of acid catalyst employed ranges from about 2 to about 5 weight percent since satisfactory results are obtained within this range.

The temperature at which this reaction is run ranges from about room temperature to the reflux temperature of the system. Generally, reflux temperatures are employed since faster reaction rates are experienced within this range.

The reaction time generally ranges from about 30 minutes up to about 6 hours. However, for economic reasons, the preferred reaction time ranges from about 1 to about 4 hours.

Thus, from the foregoing it can be seen that conventional esterification methods can be used. Typical conventional esterification methods are disclosed for example in "Organic Chemistry," by Paul Karrer, 4th Edition, 1950, and specifically at pages 210–212.

There are numerous methods by which 4,4'-bibenzoic acid can be produced. In one such method, 4,4'-biphenyl dicarboxylic acid is produced by reacting an alkali metal with sodium benzoate at a temperature greater than about 200° C. wherein the metal is employed in catalytic proportions of less than about 0.2 equivalent of metal per equivalent of benzoate. This product is then reacted with carbon dioxide and hydrolyzed to produce the acid. Other acids which may be present are benzoic acid, 4-carboxy biphenyl, 3,3'-bibenzoic, terephthalic, isophthalic, 2,2'-bibenzoic, and the like. Another method of producing 4,4'-bibenzoic acid is by chloromethylation of biphenyl disclosed in U.S. Patent 3,007,975. Chloromethylation may occur preferentially in the 4,4' position, but some by-products will be produced wherein the methylation occurs in other positions, thus producing isomers of bibenzoic acid. U.S. Patent 2,809,210 describes coupling of halogenated benzoic acids to produce bibenzoic acid. Again, unless care is taken to carefully purify the reactants, the process will also produce 4,4'-bibenzoic acid in admixture with other carboxylic acid species.

The process of this invention can be better understood by the following examples in which all parts are by weight unless otherwise specified.

Example I

Isopropyl alcohol (235.5 parts) was mixed with 5 parts of mixture of acids containing 4,4'-bibenzoic acid, benzoic acid, terephthalic acid, 4-carboxy biphenyl and essentially 20 other unknown carboxylic acids as indicated by infrared analysis. Anhydrous hydrogen chloride (0.75 part) was added as a catalyst. The mixture was heated to the reflux temperature of the system for a period of 5 hours. The solution containing solids was filtered and the solid 4,4'-bibenzoic acid recovered. The acid was then esterified with methyl alcohol and the recovered dimethyl bibenzoate melted at 214–215° C.

Example II

Secondary butyl alcohol (235.5 parts) was mixed with 5 parts of a mixture of acid containing 4,4'-bibenzoic acid, benzoic acid, terephthalic acid, 4-carboxy biphenyl and essentially 20 other unkwonwn carboxylic acids as indicated by infrared analysis. Sulfuric acid (0.75 part) was added as a catalyst. The mixture was heated to the reflux temperature of the system for a period of 5 hours. The solution containing solids was filtered and the solid 4,4'-bibenzoic acid recovered. The recovered bibenzoic acid was esterified with n-butyl alcohol and the recovered dibutyl ester melted at 46–47° C.

Alcohols other than secondary, and in some cases tertiary alcohols, readily esterify 4,4'-bibenzoic acid. Thus, after 4,4'-bibenzoic acid is recovered it may be esterified with other alcohols such as methyl, ethyl, n-propyl, n-butyl, n-amyl, n-hexyl, and the like to give the corresponding diesters.

The pure bibenzoic acid obtained by the process described above finds many valuable uses such as fiber monomers, polymers, plasticizers, synthetic lubricants, and the like. The uses for 4,4'-bibenzoic acid in interpolyesters, films and filaments are disclosed in the following U.S. patents: 3,008,929, 3,008,930, 3,008,931, 3,008,932, and 3,008,934.

Having thus described the process of the present invention it is not intended that it be limited except as set forth in the following claims.

We claim:

1. A process for the separation of 4,4'-bibenzoic acid from a mixture of carboxylic acids comprising contacting the mixture of acids with a secondary alkanol at a temperature of from about room temperature to the reflux temperature of the system for a period of from about 30 minutes to about 12 hours and in the presence of a mineral acid, and thereafter recovering as a solid the unreacted unesterified 4,4'-bibenzoic acid.

2. The process of claim 1 wherein the secondary alkanol is isopropyl alcohol.

3. The process of claim 1 wherein the secondary alkanol is secondary butyl alcohol.

4. The process of claim 1 conducted at the reflux temperature of the system for a period of from about 30 minutes to about 6 hours.

5. The process of claim 1 conducted at the reflux temperature of the system for a period of from about 1 to about 4 hours.

6. The process of claim 1 wherein said mineral acid is sulfuric acid.

7. The process of claim 1 wherein said mineral acid is anhydrous hydrogen chloride.

8. The process of claim 1 wherein said mixture of carboxylic acids is a mixture comprising 4,4'-bibenzoic acid, benzoic acid, terephthalic acid, and 4-carboxy biphenyl.

9. A process for the separation of 4,4'-bibenzoic acid from a mixture of carboxylic acids comprising contacting said mixture with a secondary alkanol at the reflux temperature of the system for a period of from about 30 minutes to about 12 hours in admixture with a mineral acid and thereafter recovering as a solid the unreacted unesterified 4,4'-bibenzoic acid; said mixture of carboxylic acids containing 4,4'-bibenzoic acid in admixture with other carboxylic acids and being a mixture resulting from the process consisting essentially of reacting an alkali metal and sodium benzoate at a temperature greater than about 200° C. wherein the metal is employed in proportions of less than about 0.2 equivalents of metal per equivalent of benzoate and reacting the product thereby formed with carbon dioxide followed by hydrolysis to produce said carboxylic acid mixture.

10. The process of claim 9 conducted at the reflux temperature of the system for a period of from about 30 minutes to about 6 hours.

11. The process of claim 9 conducted at the reflux temperature of the system for a period of from about 30 minutes to about 4 hours.

12. The process of claim 9 wherein said mineral acid is sulfuric acid.

13. The process of claim 9 wherein said mineral acid is anhydrous hydrogen chloride.

14. The process of claim 9 wherein the secondary alkanol is isopropyl alcohol.

15. The process of claim 9 wherein the secondary alkanol is secondary butyl alcohol.

References Cited by the Examiner

UNITED STATES PATENTS

| | | | |
|---|---|---|---|
| 2,733,266 | 1/1956 | McKinnis | 260—525 |
| 2,809,210 | 10/1957 | Short et al. | 260—515 |
| 2,823,228 | 2/1958 | Raecke et al. | 260—515 |

FOREIGN PATENTS

| | | |
|---|---|---|
| 727,184 | 3/1955 | Great Britain. |

LORRAINE A. WEINBERGER, *Primary Examiner.*

LEON ZITVER, *Examiner.*